United States Patent Office 3,322,822
Patented May 30, 1967

3,322,822
PREPARATION OF HALOSULFONYL BENZOYL HALIDES
Samuel Gelfand, Niagara Falls, N.Y., assignor to Hooker Chemical Corporation, Niagara Falls, N.Y., a corporation of New York
No Drawing. Filed May 27, 1963, Ser. No. 283,573
6 Claims. (Cl. 260—544)

The present invention is concerned with a process for the preparation of halosulfonyl benzoyl halides. More specifically the present invention relates to the reaction of benzotrihalide and sulfur trioxide.

It has been known that sulfonyl chlorides are formed by the action of chlorosulfonic acid on aromatic hydrocarbons and that the yields of sulfonyl chlorides obtained may be increased by increasing the amount of chlorosulfonic acid used. See description in Berichte der Deutschen Chemischen Gesellschaft, volume 42, page 1802. Therefore, in the large scale manufacture of sulfonyl chlorides of aromatic hydrocarbons, chlorosulfonic acid is generally employed in excess. To avoid this, sulfonylchlorides are prepared from sulfonic acids by reaction with phosphorus chlorides.

It has also been known that sulfonyl chlorides of aromatic carboxylic acids are obtained by the action of chlorosulfonic acid in large excess upon aromatic carboxylic acids, as, for example, in the conversion of an aromatic carboxylic acid chloride into the sulfonyl-chloride of the aromatic carboxylic acid by means of a large excess (14 moles) of chlorosulfonic acid (J. Chem. Soc. (London), 1934), page 1283.

These processes yield chlorosulfonyl aroyl acids. Further reaction with an acylating agent such as $PCl_5$, $SOCl_2$ and the like, is required to convert the product to chlorosulfonyl aroyl chloride. In general, therefore, these processes are multi-step, requiring the utilization of costly reagents and equipment.

In accordance with the present invention, a benzotrihalide is reacted with a sulfonating agent in the presence of heat. The reaction may be exemplified by the following equation:

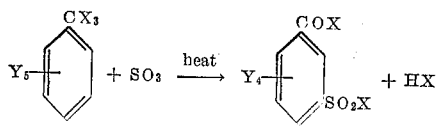

wherein X is a halogen such as chlorine or bromine, Y is individually selected from the group consisting of halogen, such as chlorine, bromine, fluorine, alkyl, preferably of one to six carbon atoms, halosubstituted alkyl and hydrogen, and at least one of said Y substituents is hydrogen on the starting reactant. It should be appreciated that other substituents can be present on the ring which will not adversely affect the reaction.

Illustrative examples of the benzotrihalide starting reagent include benzotrichloride, benzotribromide, and the like. Among the sulfonating agents which may be utilized to practice the present invention are $SO_3$ (in liquid or gaseous form), and $SO_3$ in solvent, including solvents which complex with it. An example of the complexing solvent is dioxane, while an example of a non-complexing solvent is perchloroethylene.

Also, other complexing solvents such as dimethyl formamide and the like can be employed. Non-complexing solvents such as acetylene tetrachloride and the like can be utilized. Other solvents of high enough boiling point to maintain the required reaction temperature and which do not react with either of the selected starting reagents may be utilized.

The reaction is generally accomplished by heating and stirring the reactants until the evolution of hydrogen halide ceases. Reaction temperatures will vary with the reactivity of the particular starting reactants. They will generally be in the range of from about 50 degrees centigrade to 200 degrees centigrade, and a preferred temperature employed is from about 90 degrees centigrade to about 160 degrees centigrade.

Among the alkyl substituents present on the ring are methyl, ethyl, butyl, and the like. The halosubstituted alkyl include $CF_3$ and the like.

The reagents are generally utilized in substantially equimolar amounts, but may be varied if desired. Generally the molar ratio of sulfonating agent to benzotrihalide is in the range of 1:1 to about 5:1 with the preferred ratio being about 2.3:1.

In a preferred embodiment benzotrichloride is added to $SO_3$ in the presence of heat and the resulting mixture is purified by distillation. The reaction may be illustrated by the following specific equation:

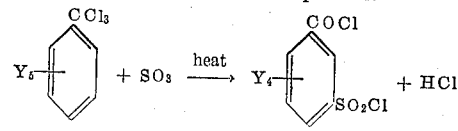

wherein the substituent Y is as defined herein.

So that those skilled in the art may better understand the present invention and the manner in which it may be practiced, the following specific examples are given. All parts are by weight and all temperatures are in degress centigrade, unless otherwise indicated.

*Example 1*

Benzotrichloride, 166 grams (0.85 mole), was added over a period of two hours to 147 grams (1.84 moles) of liquid sulfur trioxide, with stirring, during which time the temperature was increased from 30 to 100 degrees centigrade. The reaction mixture was then heated and stirred at 140 degrees centigrade for an additional four hours. A total of ten grams of hydrogen chloride was evolved. The product was distilled at reduced pressure to give 132 grams (0.55 mole; 65% yield) of meta-chlorosulfonylbenzoyl chloride of boiling point 114–116 degrees centigrade at 0.4 mm. Hg pressure.

*Example 2*

Benzotrichloride, 196 grams (1.0 mole), in a 500 ml. three necked flask equipped with stirrer, thermometer, and gas inlet tube was heated to 75 degrees centigrade. Sulfur trioxide, 160 grams (2.0 moles), was vaporized and was bubbled through the reaction mixture over an 80 minute period. The reaction was exothermic and the temperature was maintained between 90 and 130 degrees centigrade. Heating was continued at 90 to 100 degrees centigrade for six hours after completion of the addition. The product was distilled to give a 41% gram yield of metachlorosulfonylbenzoyl chloride.

*Example 3*

Eighty grams of $SO_3$ (1.0 mole) was vaporized into 196 grams (1.0 mole) of benzotrichloride at 40 to 50 degrees centigrade. The mixture was maintained at a temperature of about 90 degrees centigrade to 100 degrees centigrade for a period of six hours. The resultant product was fractionated to yield 4 grams of metachloro-sulfonylbenzoyl chloride.

In a similar manner and at similar molecular proportion, substituted benzotrihalides are reacted with sulfur trioxide and sulfur trioxide complexes to yield substituted halosulfonylbenzoylhalides.

While there have been described various embodiments of the invention, the methods and elements described

I claim:
1. A process for the preparation of a compound of the formula

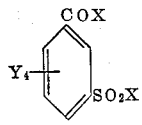

comprising reacting a compound of the formula

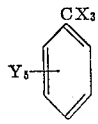

with sulfur trioxide at a temperature of about 50 to 200 degrees centigrade wherein X is a substituent selected from the group consisting of chlorine and bromine, and Y is a substituent independently selected from the group consisting of chlorine, bromine, fluorine, alkyl, halosubstituted alkyl, and hydrogen, and at least one of said Y substituents of the starting reactant is hydrogen.

2. A process in accordance with claim 1 wherein X is chlorine.

3. A process for the preparation of a compound of the formula

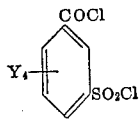

comprising contacting a compound of the formula

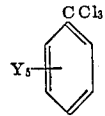

with sulfur trioxide at a temperature of from about 60 degrees centigrade to about 150 degrees centigrade wherein Y is independently selected from the group consisting of halogen, alkyl, hydrogen, halosubstituted alkyl, and at least one of said Y substituents of the starting reactant is hydrogen.

4. The process of claim 3 wherein the molar ratio of sulfur trioxide to

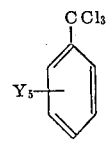

is in the range of 1:1 to about 5:1.

5. A process for the preparation of m-chlorosulfonylbenzoyl chloride comprising contacting benzotrichloride with sulfur trioxide at a temperature of from about 60 degrees centigrade to about 150 degrees centigrade, wherein said sulfur trioxide and benzotrichloride are in a molar ratio of 1:1 to about 5:1 thereby producing m-chlorosulfonylbenzoyl chloride.

6. The process of claim 5 wherein the molar ratio is about 2.3:1.

References Cited
UNITED STATES PATENTS

| | | | |
|---|---|---|---|
| 2,016,784 | 11/1935 | Kraenzlein et al. | 260—543 |
| 2,273,974 | 2/1942 | Meiser | 260—507 |
| 3,203,987 | 8/1965 | Hoefle | 260—544 X |

OTHER REFERENCES

Houben-Weyl: "Methoden dei Organische Chemie," vol. 9, 1955, pp. 390–391, 401, 564, 568.

Lauer: "J. Fur Praktische Chemie," vol. 142, pp. 252–257 (1935).

LORRAINE A. WEINBERGER, *Primary Examiner.*

RICHARD K. JACKSON, *Examiner.*